US000001460H

United States Statutory Invention Registration [19]

[11] Reg. Number: H1460

Davis

[43] Published: Jul. 4, 1995

[54] SPIRAL-MODE OR SINUOUS MICROSCRIP ANTENNA WITH VARIABLE GROUND PLANE SPACING

[75] Inventor: Robert L. Davis, Englewood, Ohio

[73] Assignee: The United States of America as represented by the Secretary of the Air Force, Washington, D.C.

[21] Appl. No.: 866,777

[22] Filed: Apr. 2, 1992

[51] Int. Cl.[6] ..... H01Q 11/08

[52] U.S. Cl. ..... 343/700 MS; 343/895

[58] Field of Search ..... 343/895, 700 MS; H01Q 1/36, 9/40, 13/08, 1/38, 11/00, 11/01, 11/02, 11/03, 11/04, 11/05, 11/06, 11/07, 11/08

[56] References Cited

U.S. PATENT DOCUMENTS

| | | | |
|---|---|---|---|
| 4,573,212 | 2/1986 | Lipsky | 455/282 |
| 4,608,572 | 8/1986 | Blakney et al. | 343/895 |
| 4,658,262 | 4/1987 | DuHamel | 343/792.5 |
| 4,823,145 | 4/1989 | Mayes et al. | 343/895 |
| 4,990,927 | 2/1991 | Ieda et al. | 343/700 MS |
| 5,003,318 | 3/1991 | Berneking et al. | 343/700 MS |
| 5,006,858 | 4/1991 | Shirosaka | 343/700 |
| 5,008,681 | 4/1991 | Cavallaro et al. | 343/700 MS |

FOREIGN PATENT DOCUMENTS 0394960 10/1990 European Pat. Off. ..... H01Q 9/40

OTHER PUBLICATIONS

Tripp et al., Multi-Octave Microstrip Antennas, Proceedings of the 1990 Ant. Appl. Symp. Illinois Sep., 1990 30 pages.

J. P. Scherer, The Dual Polarized Sinuous Antenna, Journ. of Electronic Defense, Aug. 1990, pp. 73–75.

Wang et al., Design of Multioctave Spiral-Mode Microstrip Antennas IEEE Trans. on Ant. & Prop. Mar., 1991.

Wang et al., Design of Broadband, Conformal, Spiral Microstrip Antenna 1990 URSI Radio Science Meeting, Dallas, May 1990 1 page.

Thursby et al., Subminiature Telemetry Antenna Study Air Force Report #AFATL-TR-89-27, pp. 37–40 Including Abstract and 4 attached cover sheets.

*Primary Examiner*—Bernarr E. Gregory

*Attorney, Agent, or Firm*—Bernard E. Franz

[57] ABSTRACT

This is a microstrip antenna which eliminates the cavity used typically in spiral and sinuous type antennas. A small spacer between the antenna element and ground plane replaces the cavity. This significantly reduces the depth of the antenna and permits antenna shapes which conform to a vehicle skin, such as an aircraft. The microstrip has demonstrated higher gain and efficiency than the cavity, but only over a limited bandwidth less than that of existing cavity backed antennas. To increase the bandwidth, the antenna has a variable thickness spacer with the thickness proportional to the distance from the center of the antenna. The employment of this variable spacer results in maintaining the high gain and efficiency of the microstrip antenna over a much larger bandwidth comparable to the existing cavity backed antennas.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SPIRAL-MODE OR SINUOUS MICROSCRIP ANTENNA WITH VARIABLE GROUND PLANE SPACING

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a spiral-mode or sinuous microstrip antenna with variable ground plane spacing.

A new class of microstrip antenna has been reported in various journal articles. Most of the reported journal articles are due to research sponsored/supported by the Wright laboratory at Wright-Patterson Air Force Base, Ohio. This microstrip antenna eliminates the cavity used typically in spiral and sinuous type antennas. A small spacer between the antenna element and ground plane replaces the cavity. This significantly reduces the depth of the antenna and permits antenna shapes which conform to the vehicle skin. The microstrip has demonstrated higher gain and efficiency than the cavity, but only over a limited bandwidth less than that of existing cavity backed antennas. In existing microstrip antennas the spacer between the ground plane and antenna element is a constant depth or thickness. The following articles are of interest with respect to such microstrip antennas.

1. J. J. H. Wang and V. K. Tripp, "Design of Broadband, Conformal, Spiral Microstrip Antenna", 1990 URSI Radio Science Meeting, Dallas, Tex., May 1990.
2. J. J. H. Wang and V. K. Tripp, "Design of Multi-octave Spiral-Mode Microstrip Antennas", IEEE Trans. Ant. Prop., Mar. 1991.
3. V. K. Tripp and J. J. H. Wang, "Multi-octave Microstrip Antennas", Proceedings of the 1990 Antenna Applications Symposium, Allerton Park, Ill., September 1990.

The following United States patents are of general interest with respect to microstrip and cavity backed antennas.

5,008,681—Cavallaro et al
5,006,858—Shirosaka
5,003,318—Berneking et al
4,990,927—Ieda et al
4,573,212—Lipsky
4,658,262—DuHamel The patents to Cavallaro et al, Shirosaka, and Ieda et al deal with the mounting of microstrip antennas. The patent to Berneking et al discloses a wide bandwidth. The patent to Lipsky discloses a typical cavity backed antenna, in a device having a detector mixer unit integrated with a spiral antenna. The patent to DuHamel discloses a cavity backed sinuous antenna.

The most prevalent receiving antenna on military aircraft is the cavity backed and loaded spiral. Recently, the similar cavity backed and loaded sinuous has begun to supplement the spiral (See James P. Scherer, "The Dual Polarized Sinuous Antenna", Journal of Electronic Defense, Aug., 1990, hereby incorporated by reference; and the DuHamel U.S. Pat. No. 4,658,262, also hereby incorporated by reference). These cavity loaded antennas are widely deployed because of their wide band (900%) frequency operation. A cross section of a typical cavity spiral is illustrated in FIG. 1. It consists of an antenna element such as copper over a cavity containing materials which absorb the field currents and prevent reflections back to the antenna element. If the absorbing material is not employed, the cavity antenna is capable of high efficiency; however, in this seldom used form, the bandwidth is only about 10% which severely limits its application. The use of absorbing material reduces the gain by 3 dB and efficiency to less than 50% but permits operation over very large bandwidth. The reduction of efficiency severely limits its application for transmitting. The cavity complicates the installation of the antenna on aircraft and also prevents conformal installation. The size of the cavity and the non conformal installation required become very important for frequencies below 2 GHz. As a result the cavity loaded antenna has found its greatest application for receive functions above 2 GHz. The absorbing material varies according to the application, but can be a low dielectric material such as foamed polystyrene loaded with graphite for laboratory experimentation.

The sinuous form of the antenna of FIG. 1 is shown in FIGS. 7, 8 and 9; which are copies of FIGS. 1, 2 and 3 of the DuHamel patent.

An antenna in accordance with an embodiment of the prior art DuHamel invention is shown in FIG. 7 with the spherical coordinate system r, $\theta$, $\phi$. It consists of four sinuous arms 11 lying on a plane and emanating from a central point 12 located near the Z axis. The arms interleaf each other without touching and are defined such that a rotation of the antenna of 90° about the Z axis leaves the antenna unchanged. The arms are excited by a feed network and a four wire transmission line (not shown) connected to the arm at the inner-most points 12 so as to produce currents with equal magnitudes and a progressive phase shift of +90° or −90° to achieve two senses of circular polarization (CP). The antenna is placed over a conducting cavity 13 (usually filled with absorbing material) so as to produce a rotationally symmetric unidirectional pattern with the peak on the Z axis. The feed network, which may consist of two baluns and a 3 db 90° hybrid, may be placed underneath the cavity. The four wire transmission line runs from the bottom of the cavity along the Z axis to the feed points 12. Without the cavity, the antenna produces a rotationally symmetric bi-directional pattern with opposite senses of CP in opposite directions. The arms consist of metal strips 14 with width which increase with distance from the center. Printed circuit board techniques may be used to obtain strips with a width and thickness of a few thousandths of an inch.

The sides of the sinuous arms are defined by curves related to the curve 16 shown in FIG. 8. In general the curve consists of P cells numbered 1 to P. The line ABC forms cell number 1, the line CDE forms cell number 2, and so on. The radii $R_p$ define the outer radius of each cell. The design parameters $\alpha_p$, a positive number and $\tau_p$, a positive number less than 1, define the angular width and ratio of inside to outside radius for each cell respectively. The equation for the curve $p^{th}$ cell is given by $$\phi = (-1)^P \alpha_p \sin\left[\frac{180\ln(r/R_p)}{\ln\tau_p}\right] \text{for } R_{p+1} \leqq r \leqq R_p$$

where r and $\phi$ are the polar coordinates of the curve.

The radii $r_p$ are related by $$R_p = \tau_{p-1} R_{p-1}$$

This type of cell is termed a sine-log cell. If $\alpha_p$ and $\tau_p$ are independent of p, then the curve is a log-periodic of the logorithm or the radius r. If $\alpha_p$ and $\tau_p$ are not independent of p then we may refer to the curve as a quasi-log periodic curve or a tapered alpha and tau curve.

If we define $\tau_p$ by $$\tau_p = \frac{1 - p(1 - \tau_1)}{1 - (p - 1)(1 - \tau_1)} \text{ for } p > 1$$

then the radial lengths of the cells are identical. If, in addition, $\alpha_p$ is independent of p, the curve is a periodic function of the radius. In this case the curve may be defined by $$\phi = \alpha \sin(180\ P\ r)$$

where P is the number of cells for a normalized radius of $R_1 = 1$. These cells are termed sine cells. For $\tau$ close to one there is little difference between the sine-log and sine cells. This curve is analogous to the Archimedes spiral curve.

FIG. 9 shows a single sinuous arm of the antenna of FIG. 7, defined by two curves 17,18 for the $p^{th}$ cell of the form $$\phi = (-1)^P \alpha_p \sin\left[\frac{180 \ln(r/R_p)}{\ln \tau_p}\right] \pm \delta \text{ for } R_{p+1} \leqq r \leqq R_p$$

The two curves have the same shape as the curve of the first equation above but are rotated plus or minus $\delta$ degrees about the origin. The tip or outermost point of a cell occurs at the angle $\alpha_p + \delta$ with respect to the centerline of the arm. The arm resembles a wide angle log-periodic zigzag antenna which has been distorted and curved to fit into a circular region. In contrast to a normal wire zigzag antenna the width of a sinuous arm within a cell varies with distance along the arm and the extra metal in the form of a protusion 19 and the sharp bends forms shunt capacitive loading at these points.

Further discussion of the theory of the sinuous antenna and variations may be found in the DuHamel patent.

Recently a new class of microstrip antennas has appeared which eliminates the cavity and substitutes a thin spacer and a small amount of absorber on the antenna element at the outside edge to attenuate the currents in the antenna element at the edge (see said articles by Wang and Tripp) or a loaded foam absorber starting near the outside edge but extending slightly beyond the outside edge of the antenna element to attenuate the field. The amount of absorber used is much less than for the cavity backed antenna and only a thin film of resistive material (typically a graphite loaded paint or paste) is required at the outside of the antenna element to maintain a good axial ratio and to prevent ripple in the beam pattern. The antenna element can be of the same design and construction as for the cavity loaded antenna described above and can be etched from and remain on a thin low dielectric board. The microstrip antenna is illustrated in FIG. 2. A thin spacer of low dielectric such as foamed polystyrene has been used in laboratory experiments described in recent publications. The application of the microstrip to high speed aircraft would require a different spacer than the cheap foamed polystyrene widely available from left over or surplus packing material used in the laboratory experiments. This microstrip antenna (illustrated in FIG. 2) is undergoing laboratory experiments and has not yet transitioned to aircraft deployment. This microstrip antenna of FIG. 2 employs a spacer of constant thickness. Recent published efforts also described successful application to curved surfaces.

However, all these experiments employed a constant spacer thickness. This limits the maximum bandwidth of the microstrip antenna to less than the cavity loaded design over a 300 to 400% bandwidth. The efficiency and gain degrade as the spacing increases beyond 0.2 wavelength. Operation above 12 GHz is also dependent upon the time and expense allotted to very precise construction of the antenna element near the center of a spiral or sinuous antenna element for either the cavity backed design or the microstrip design. Operation at the lowest frequencies is limited by the size or diameter of either the cavity or microstrip designs. Additionally, the microstrip is limited by the spacer thickness becoming too small at low frequencies. As the thickness decreases below 0.05 wavelength, the gain (and efficiency) are degraded. Thus, the spacer is a compromise between small spacing at high frequencies and the wider spacing a low frequencies. Gain, efficiency and impedance are effected by the compromise.

A copending U.S. patent application having the same assignee as the present application, Ser. No. 07,/578,034, now U.S. Pat. No. 5,155,493, for a "Tape Type Microstrip Patch Antenna", teaches use of tape dielectric with non-uniform thickness or dielectric properties. The same antenna is described at pages 37–40 of an unpublished technical report AFATL-TR-89-27 (available from DTIC as AD-B137 538) by Thursby et al for a "Subminiature Telemetry Antenna", from the Air Force Armament Laboratory (now part of Wright Laboratories), Eglin Air Force Base, Fla.

SUMMARY OF THE INVENTION

An objective of the invention is to modify the design of microstrip antennas for greater bandwidth potential and thereby permit wider application.

The invention relates to a microstrip antenna which eliminates the cavity used typically in spiral and sinuous type antennas. A small spacer between the antenna element and ground plane replaces the cavity. This significantly reduces the depth of the antenna and permits antenna shapes which conform to the vehicle skin. The microstrip has demonstrated higher gain and efficiency than the cavity, but only over a limited bandwidth less than that of existing cavity backed antennas. The present invention is for a variable thickness spacer with the thickness proportional to the distance from the center of the antenna. The employment of this variable spacer results in maintaining the high gain and efficiency of the microstrip antenna over a much larger bandwidth comparable to the existing cavity backed antennas.

The cavity loaded spiral antenna has been very widely deployed in high production US military aircraft. The microstrip antenna with a variable spacer is a very promising replacement for the cavity loaded antenna in these aircraft for electronic warfare systems. Multiple antennas are used on each aircraft. Applications are not only for electronic warfare but also for navigation and communication systems. Other applications include ground vehicles such as tanks and trucks and on the helmets of military personnel. Since the aforementioned microstrip antennas use conventional etching techniques common to printed circuit boards, it should be capable of mass-produced manufacture at low cost.

DETAILED DESCRIPTION

Figure 1:
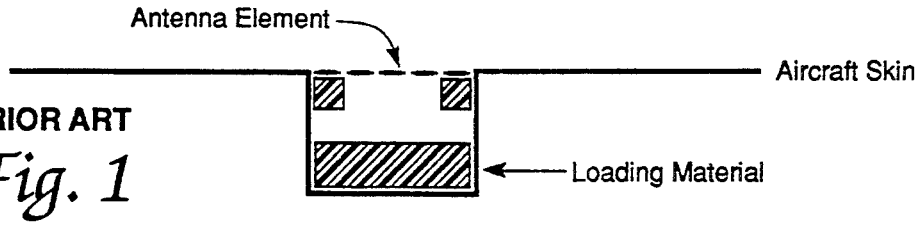
PRIOR ART Fig. 1
FIG. 1 is a cross sectional diagram of a conventional/typical prior art cavity antenna.

The antenna elements shown in the drawings may be either spiral or sinuous.

The DuHamel U.S. Pat. No. 4,658,262 states that *The American Heritage Dictionary* defines the adjective sinuous as 'characterized by many curves or turns; winding.' Sinuous as used herein, is generalized to characterize lines consisting of curves or curves and sharp turns or bends, or straight lines and sharp turns with the sharp turns or bends occurring in an alternating fashion. Thus, zigzag curves are included in this definition. This definition of "sinuous" is adopted herein.

More specifically, in claim 1 of DuHamel, the radiating member is defined as a sinuous conductor extending away from a common point with the common point the center of a coordinate system (r, $\phi$) with a rotational symmetry such that a rotation of 360/N degrees about an axis containing the common point leaves the structure unchanged, wherein each arm consists of a cascade of cells numbered 1 to P, where 1 is the large cell and the outside and inside radii of the $p^{th}$ cell, measured from the common point, are given by $R_p$ and $R_{p+1}$ and are related by the design parameter $\tau_p$, which is less than 1, wherein $R_{p+1}=\tau_p R_p$, each cell comprising a conductor portion having a sharp bend with a protusion and wherein the center line of each sinuous conductor of each cell is defined by a line with the angular coordinate $\phi$ being an oscillating function of the radius and varying smoothly as a function of radius from $\phi_n$ to $\phi_n+\alpha_p$ to $\phi_n$ degrees for one cell and from $\phi_n$ to $\phi_n-\alpha_p$ to $\phi_n$ degrees for the next cell where the $\alpha_p$'s are positive numbers and $\phi_n$ is the angle to the start of the first cell for the n'th arm and the $\alpha_p$'s are such that the cells of adjacent sinuous arms are interleaved and spaced from one another.

Figure 2:
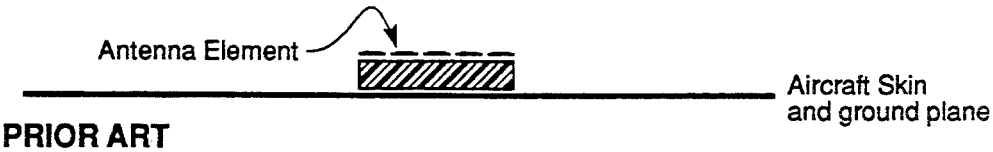
PRIOR ART Fig. 2
FIG. 2 is a cross sectional diagram of a prior art microstrip antenna with constant spacer depth.
Figure 3:
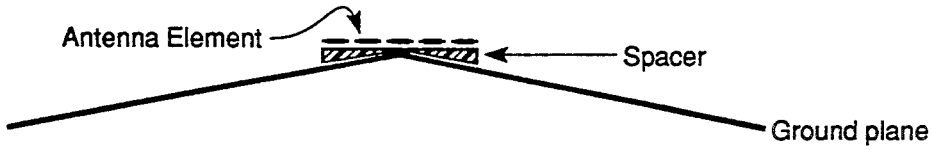
FIGS. 3, 4 and 5 are cross sectional diagrams of microstrip antennas according to the invention, with variable spacer depth.
Figure 4:
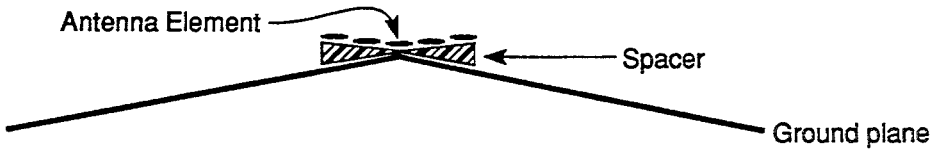
Figure 5:
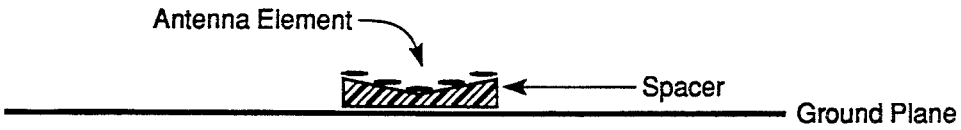

FIG. 3 illustrates the same microstrip antenna as in FIG. 2 except with variable spacer depth. The materials can be identical to that described in FIG. 2 for the constant spacer method. There are two basic methods for achieving the variable space depth. The first method is illustrated in FIG. 4 and comprises a conical or cone shaped ground plane. The second method is illustrated in FIG. 5 and comprises a conical shaped antenna element and flat ground plane. Other variations include shaping both the ground plane and element. Experimentally a slope (spacer depth to distance from the center) of 0.35 to 0.50 has performed well.

ADVANTAGES AND NEW FEATURES. The primary advantage of the variable spacer is to maintain the gain of the constant spacer design over a larger bandwidth. The aperture size of constant spacer design and the variable spacer design are identical and the increased gain is the result of maintaining high efficiency over a larger bandwidth. The gain is an important advantage for receive applications and the higher efficiency is an advantage for transmit applications. The new feature is the application of variable spacers to microstrip antennas.

ALTERNATIVES. The requirement is for a variable electrical spacing between the ground plane and antenna element. In FIG. 3, this is achieved by varying the physical spacing. Alternatives include varying this spacing by some combination of shaping both the element and ground plane and not just the ground plane as in FIG. 3. This is illustrated in FIG. 4. The shaped ground plane (or antenna element) does not need to be a straight line or constant slope as shown. Deviations from the straight line or constant slope and can be useful to fine tune the antenna.

Figure 6:
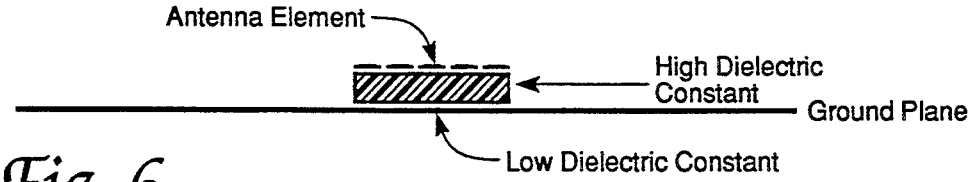
FIG. 6 is a cross sectional diagram of a microstrip antenna according to the invention, with variable electrical spacing.
Figure 7:
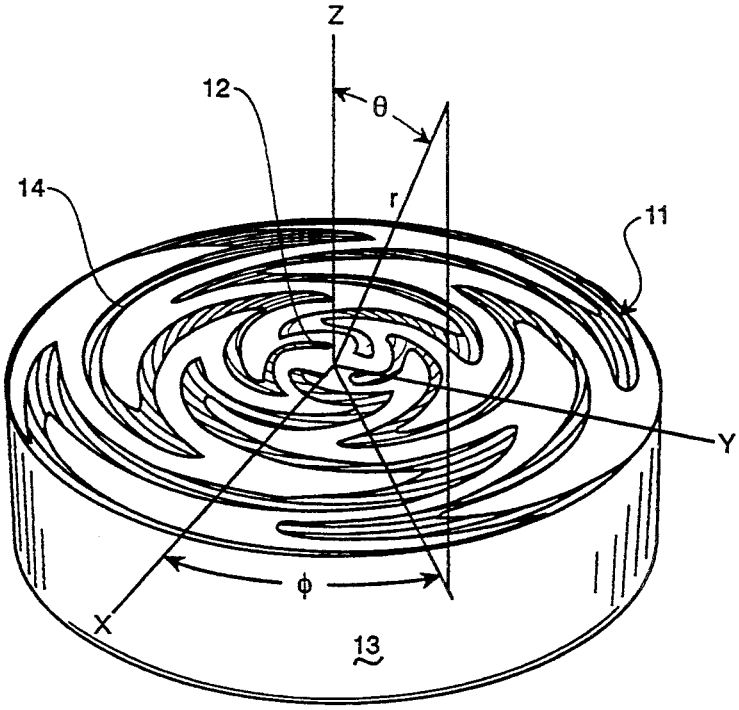
PRIOR ART Fig. 7
FIG. 7 is a perspective view of a cavity backed four arm planar quasi-log-periodic sinuous antenna.
Figure 8:
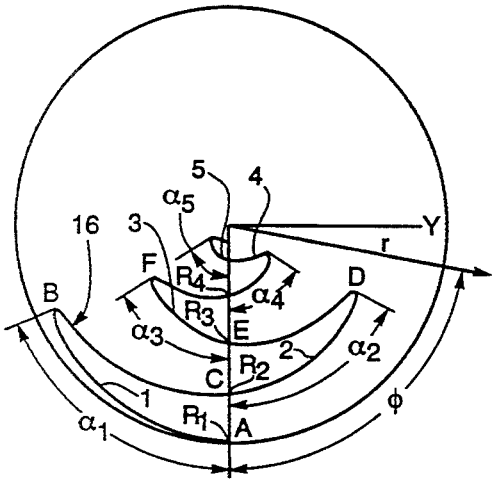
PRIOR ART Fig. 8
FIG. 8 shows a curve composed of a sine-log type cell which may be used to define the arms of an N arm quasi-periodic sinuous antenna of the type shown in FIG. 7.
Figure 9:
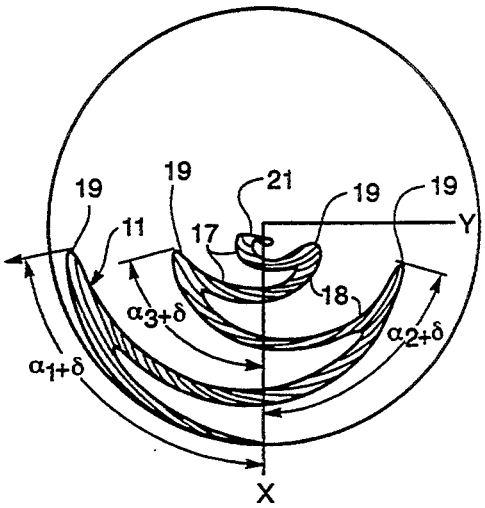
PRIOR ART Fig. 9
FIG. 9 shows a single arm sinuous antenna based on the curve of FIG. 8.

The increase in electrical depth can also be achieved by increasing the loading (permittivity or permeability) of the spacer as the distance from the center increases as in FIG. 6. This loading will also decrease the size (diameter) of the antenna, but will also decrease the performance compared to a larger unloaded antenna.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A microstrip antenna comprising a dielectric member having first and second major surfaces, a spiral radiating member of conductive material connected along the first major surface of said dielectric member, a grounding member of conductive material connected along the second major surface of said dielectric member;

wherein said dielectric member is non-uniform in a dimension between the radiating member and the grounding member, being relatively thin at the center and thicker at the periphery, whereby the microstrip antenna has high gain and efficiency over a large bandwidth.

2. A microstrip antenna according to claim 1, wherein said grounding member is cone shaped, and the second major surface of the dielectric member is cone shaped to match the grounding member.

3. A microstrip antenna according to claim 1, wherein said radiating member is cone shaped, and the first major surface of the dielectric member is cone shaped to match the radiating member.

4. A microstrip antenna comprising a dielectric member having first and second major surfaces, a radiating member of conductive material connected along the first major surface of said dielectric member, a grounding member of conductive material connected along the second major surface of said dielectric member;

wherein said radiating member is selected from the class consisting of spiral and sinuous elements;

wherein said dielectric member is non-uniform in dielectric properties between the radiating member and the grounding member, with a relatively low dielectric constant at the center and a higher dielectric constant at the periphery, whereby the microstrip antenna has high gain and efficiency over a large bandwidth.

5. A microstrip antenna comprising a dielectric member having first and second major surfaces, a sinuous radiating member of conductive material connected along the first major surface of said dielectric member, a grounding member of conductive material connected along the second major surface of said dielectric member;

wherein said dielectric member is non-uniform in a dimension between the radiating member and the grounding member, being relatively thin at the center and thicker at the periphery, whereby the microstrip antenna has high gain and efficiency over a large bandwidth.

6. A microstrip antenna according to claim 5, wherein said radiating member is a sinuous conductor extending away from a common point with the common point the center of a coordinate system (r, $\phi$) with a rotational symmetry such that a rotation of 360/N degrees about an axis containing the common point leaves the structure unchanged, wherein each arm consists of a cascade of cells numbered 1 to P, wherein 1 is the largest cell and the outside and inside radii of the $p^{th}$ cell, measured from the common point, are given by $R_p$ and $R_{p+1}$ and are related by the design parameter $\tau_p$, which is less than 1, wherein $R_{p+1}=\tau_p R_p$, each cell comprising a conductor portion having a sharp bend with a protusion and wherein the center line of each sinuous conductor of each cell is defined by a line with the angular coordinate $\phi$ being an oscillating function of the radius and varying smoothly as a function of radius from $\phi_n$ to $\phi_n+\alpha_p$ to $\phi_n$ degrees for one cell and from $\phi_n$ to $\phi_n-\alpha_p$ to $\phi_n$ degrees for the next cell where the $\alpha_p$'s are positive numbers and $\phi_n$ is the angle to the start of the first cell for the n'th arm and the $\alpha_p$'s are such that the cells of adjacent sinuous arms are interleaved and spaced from one another.

* * * * *